Feb 14, 1933.  E. R. MORTON  1,897,068

CONSTANT SPEED MOTOR

Filed Sept. 23, 1930

INVENTOR
E. R. MORTON
BY *Wayne B Wells*
ATTORNEY

Patented Feb. 14, 1933

1,897,068

UNITED STATES PATENT OFFICE

EDMUND R. MORTON, OF NEW YORK, N. Y., ASSIGNOR TO BELL TELEPHONE LABORATORIES, INCORPORATED, OF NEW YORK, N. Y., A CORPORATION OF NEW YORK

CONSTANT SPEED MOTOR

Application filed September 23, 1930. Serial No. 483,798.

This invention relates to direct current motors which are held at constant speed with fairly close precision.

One object of the invention is to provide a direct current motor that shall operate at reasonably high field flux densities and apply a field flux to the armature which is directly proportional to the line voltage applied to the armature.

Another object of the invention is to provide a direct current motor that shall have non-magnetic gaps in the field structure and magnetic shunts to carry a portion of the field flux away from the armature so that the motor operates at reasonably high flux density and the field flux applied to the armature is proportional to the line voltage applied to the armature.

A further object of the invention is to provide a shunt-wound direct-current motor having a field structure substantially free from hysteresis effects that shall operate at relatively high flux densities and have the field flux applied to the armature in direct proportion to the line voltage applied to the armature.

A shunt-wound direct-current motor in order to operate at constant speed with fairly close precision should have the field flux applied to the armature in direct proportion to the line voltage applied to the armature. It is apparent that operation of a standard shunt wound motor at constant speed with fairly close precision is difficult when it is noted the magnetization curve of such motor has no extended portion on a line which extends through the origin of the curve. It is necessary to have a portion of a magnetization curve lie on a straight line extended through the origin of the magnetization curve in order to have the flux proportional to the line voltage.

In a motor constructed in accordance with the invention the field structure or a substantial part thereof is formed of permalloy to take care of hysteresis effects and to insure that the magnetization curve on rising line voltage is the same as the magnetization curve on falling line voltage. The magnetization curve is distorted by applying magnetic shunts to the motor which shunt a portion of the field flux from the armature to obtain a magnetization curve having a portion at reasonably high flux density lying on a straight line which passes through the origin of the magnetization curve. Non-magnetic gaps are placed in the field structure to raise the flux densities at which operation of the motor may be affected at constant speed and to extend the range of operation.

A relatively high resistance element is connected in series with the field winding across the line circuit to reduce the variations caused by changes in temperature of the motor.

A motor having a field structure formed of permalloy provided with magnetic shunts to carry a portion of the field flux away from the armature and having a relatively high resistance element connected in series with the field winding is disclosed and claimed in the patent to H. M. Stoller No. 1,871,347, dated August 9, 1932.

Figure 1:
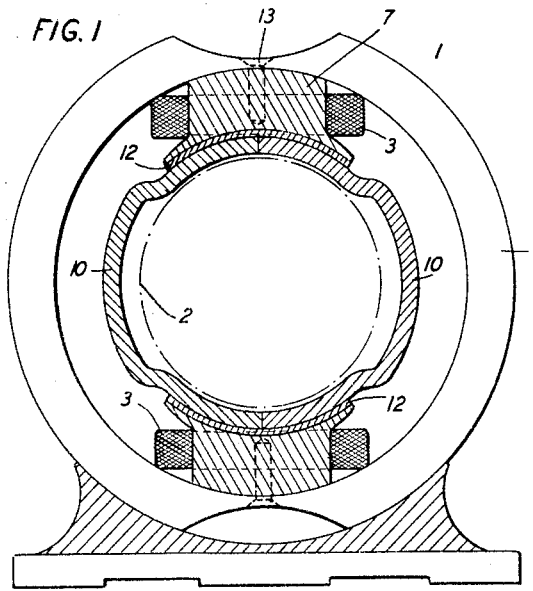
Figure 1 is a sectional elevational view of a motor constructed in accordance with the invention.
Figure 2:
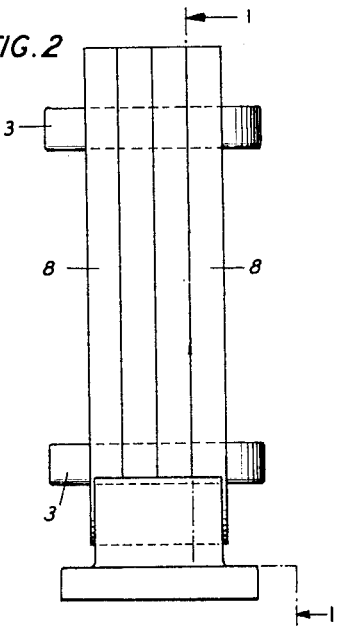
Fig. 2 is a side elevational view of the motor shown in Fig. 1.
Figure 3:
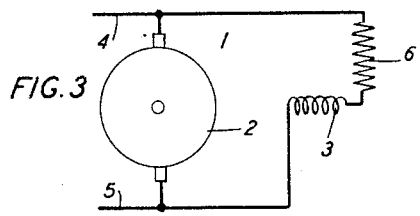
Fig. 3 is a circuit diagram of a motor constructed in accordance with the invention.

Referring to Figs. 1, 2 and 3 of the drawing a motor 1 is shown comprising an armature 2 and a shunt field winding 3. The armature 2 is connected across a line circuit comprising conductors 4 and 5. The shunt field winding 3 is connected across the line conductors 4 and 5 in series with a relatively high resistance element 6. Preferably the resistance element 6 consumes 75% of the line voltage and the shunt field winding 3 consumes approximately 25% of the line voltage. The resistance element 6 is placed in series with the shunt field winding in order to reduce to a negligible value the changes in resistance of the shunt field winding which are produced by temperature changes. The copper wire comprising the shunt field winding having a positive temperature coefficient will produce changes in the resistance of the field coils when there is any change in temperature of the coils.

The coils of the field winding 3 are supported on pole-pieces 7 which in turn are secured to the field yoke 8. The field yoke 8 is formed of plates of permalloy, each of which is preferably less than ½" in thickness. The pole-pieces 7 are preferably formed of permalloy but if so desired may be constructed of ferrous material. The per cent of the magnetic circuit occupied by the pole-pieces is so small as to have a negligible effect on the magnetization curve. The permalloy used in the field structure preferably comprises 78½% nickel and 21½% of ferrous material.

Shunts 10 of suitable magnetic material are provided for shunting a portion of the field flux away from the armature. Preferably the shunts 10 have a flux capacity of approximately 15% of the field flux of the motor. The magnetic shunts 10 distort the magnetization curve to obtain better speed characteristics as will be explained more fully when reference is made to the magnetization curve shown in Fig. 5 of the drawing. The magnetic shunts 10 are spaced an appreciable distance from the armature 2 between the pole pieces as shown in Fig. 1 of the drawing to prevent the shunts carrying any appreciable amount of flux caused by armature reaction.

Non-magnetic gaps 12 are provided in the magnetic circuit of the motor for raising the flux density at which the motor operates and for extending the range of operation. The gaps may be air-gaps or may consist of plates of non-magnetic material such as brass or copper. In Fig. 1 of the drawing, plates 12 of brass are positioned on top of the pole-pieces 7 adjacent to the magnetic shunts 10. The plates 12 of non-magnetic material are secured to the pole-pieces 7 and the pole-pieces 7 are secured to the field yoke 8 by means of suitable bolts 13.

The equation for the performance of a shunt motor is $$E_0 = IR + E_1$$

where $E_0$ is the line voltage, $IR$ is the resistance drop of the armature circuit, and $E_1$ is the counter E. M. F. of the motor. The counter E. M. F. of a motor is in turn equal to a constant times the speed times the flux. In making the substitution for $E_1$ in the above formula, we have $E_0 = IR + K\phi S$. The IR drop of the motor is substantially negligible and therefore may be dropped. Accordingly we have $E_0 = K\phi S$ or $$S = \frac{E_0}{K\phi},$$

in other words for constant speed the flux of the motor must vary proportionately to the line voltage.

Figure 4:
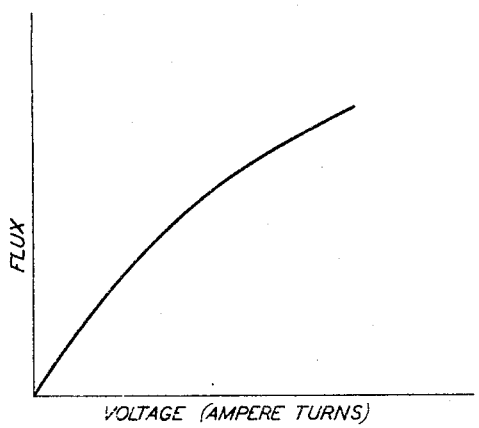
Fig. 4 is a magnetization curve of a standard shunt wound direct-current motor.

In Fig. 4 of the drawing is shown the magnetization curve of a standard shunt-wound direct-current motor. The ordinates of the curve are in terms of flux and the abscissæ are in terms of voltage or ampere turns. In such curve it is clear there is no substantial portion thereof lying on a straight line which extends through to the origin of the curve. In order to have a flux varying proportionately to the voltage it is clear that a portion of the curve must lie on a straight line which passes through the origin of the curve. It should also be noted that in a standard motor hysteresis effects prevent the magnetization curve for rising voltages to be the same as the magnetization curve of falling voltage. The hysteresis effects alone prevent the flux from varying proportionately to the line voltage.

Figure 5:
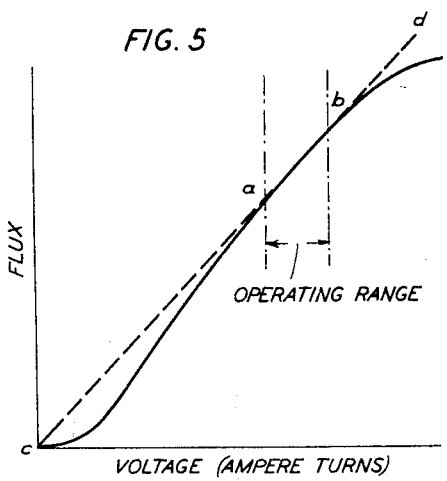
Fig. 5 is a magnetization curve of a motor constructed in accordance with the invention.

In order to obtain a portion of the magnetization curve of a motor which will lie on a straight line extending through the origin, the magnetization curve is distorted by the magnetic shunts 10 to obtain a curve of the type shown in Fig. 5 of the drawing. In the curve shown in Fig. 5 of the drawing, the flux applied to the armature is held near zero by the magnetic shunts 10 until a substantial voltage is applied to the motor. The curve shown in Fig. 5 is provided with a portion between $a$ and $b$ which lies on a line $c$—$d$. Line $c$—$d$ extends through the origin as is necessary if the portion of the curve between $a$ and $b$ is to satisfy the condition that the flux varies proportionately to the line voltage. In order to raise the portion of the curve $ab$ and to extend the range of operation of the motor, the non-magnetic gaps 12 are provided in the field structure.

Modifications in the motor and in the arrangement and location of parts may be made within the spirit and scope of the invention and such modifications are intended to be covered by the appended claims.

What is claimed is:

1. A constant-speed direct-current motor comprising an armature, a shunt field winding, a field structure having field pole pieces with non-magnetic gaps included therein, and fixed magnetic shunts extending between the pole pieces and having the portions thereof adjacent the pole pieces positioned close to the armature and the portions thereof between the pole pieces positioned a greater distance from the armature for shunting an appreciable portion of the field flux from the armature and for preventing the magnetic shunts carrying any appreciable amount of the cross flux caused by armature reaction.

2. A constant speed direct current motor comprising an armature, a shunt field winding, a field structure having field pole pieces with non-magnetic gaps included therein, and permanent magnetic shunts extending between the field pole pieces with said non-magnetic gaps positioned between the pole pieces and said magnetic shunts and having the portions of the magnetic shunts adjacent to the pole pieces positioned close to the armature and the portions thereof between the pole pieces positioned a greater distance from the armature for shunting an appreciable portion of the field flux from the armature and for preventing the magnetic shunts carrying any appreciable amount of cross flux caused by armature reaction.

3. A constant speed direct current motor comprising an armature winding mounted on a supporting core member, a shunt field winding, a field supporting core member having field pole pieces with non-magnetic gaps included therein, and magnetic shunts extending between the field pole pieces with said magnetic gaps between the pole pieces and said magnetic shunts and having the portions of the magnetic shunts adjacent the pole pieces positioned close to the armature and the portions of the magnetic shunts between the pole pieces positioned a greater distance from the armature for shunting an appreciable portion of the field flux from the armature and for preventing the magnetic shunts carrying any appreciable amount of the cross flux caused by armature reaction, one of said core members being composed of ferrous material and the other core member being composed substantially of permalloy.

In witness whereof, I hereunto subscribe my name this 19th day of September, 1930.

EDMUND R. MORTON.